US012804223B2

(12) United States Patent
Manabe

(10) Patent No.: US 12,804,223 B2
(45) Date of Patent: Nov. 17, 2026

(54) SYSTEM, METHOD, AND NON-TRANSITORY COMPUTER-READABLE STORAGE MEDIUM STORING PROGRAM FOR STREAMING CONTENT

(71) Applicant: DeNA Co., Ltd., Tokyo (JP)

(72) Inventor: Ko Manabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 19/091,024

(22) Filed: Mar. 26, 2025

(65) Prior Publication Data

US 2025/0227324 A1 Jul. 10, 2025

Related U.S. Application Data

(63) Continuation of application No. PCT/JP2023/033833, filed on Sep. 19, 2023.

(30) Foreign Application Priority Data

Sep. 27, 2022 (JP) ................................ 2022-153575

(51) Int. Cl.
*H04N 21/431* (2011.01)

(52) U.S. Cl.
CPC ................................ *H04N 21/4316* (2013.01)

(58) Field of Classification Search
CPC ... H04N 21/4316; H04N 21/258; G06Q 50/00
See application file for complete search history.

(56) References Cited

U.S. PATENT DOCUMENTS

2022/0312078 A1* 9/2022 Cui .................... H04N 21/4788

FOREIGN PATENT DOCUMENTS

| | | | |
|---|---|---|---|
| JP | 2017121021 | A | 7/2017 |
| JP | 2019071957 | A | 5/2019 |
| JP | 6668549 | B1 | 3/2020 |
| JP | 2021197730 | A | 12/2021 |

(Continued)

OTHER PUBLICATIONS

Office Action issued in corresponding Japanese Patent Application No. 2022-153575, mailed Sep. 30, 2025, with translation (11 pages).

(Continued)

*Primary Examiner* — Anthony Bantamoi
(74) *Attorney, Agent, or Firm* — Osha Bergman Watanabe & Burton LLP

(57) ABSTRACT

A content streaming server according to one embodiment of the present invention allows a user viewing content to obtain an increased sense of unity with other viewing users. The server is communicatively connected to a user terminal through a communication network and provides a content streaming service to a user through the user terminal. The server starts a predetermined mode in response to one of viewing users viewing specific content satisfying a predetermined condition and allows the other viewing users viewing the same content to perform predetermined input through a viewing screen presented to them, in accordance with the start of the predetermined mode. Thus, each viewing user is able to enjoy such a predetermined mode together with the other users.

11 Claims, 11 Drawing Sheets

(56) References Cited

FOREIGN PATENT DOCUMENTS

JP 7125729 B1 8/2022

OTHER PUBLICATIONS

Pixiv Secretariat, "You can 'share a ride' with everyone! pixiv new feature 'request function' has been released", online, Sep. 30, 2020, https://www.pixiv.net/info.php?id=6252.

International Search Report issued in corresponding International Application No. PCT/JP2023/033833, mailed Oct. 31, 2023, with translation (5 pages).

Written Opinion issued in corresponding International Application No. PCT/JP2023/033833, mailed Oct. 31, 2023, with translation (8 pages).

* cited by examiner

USER INFORMATION TABLE 151

| |
|---|
| USER ACCOUNT |
| BASIC INFORMATION |
| RANK |
| OWNED COIN COUNT |
| OWNED DIAMOND COUNT |
| ... |

FIG. 2

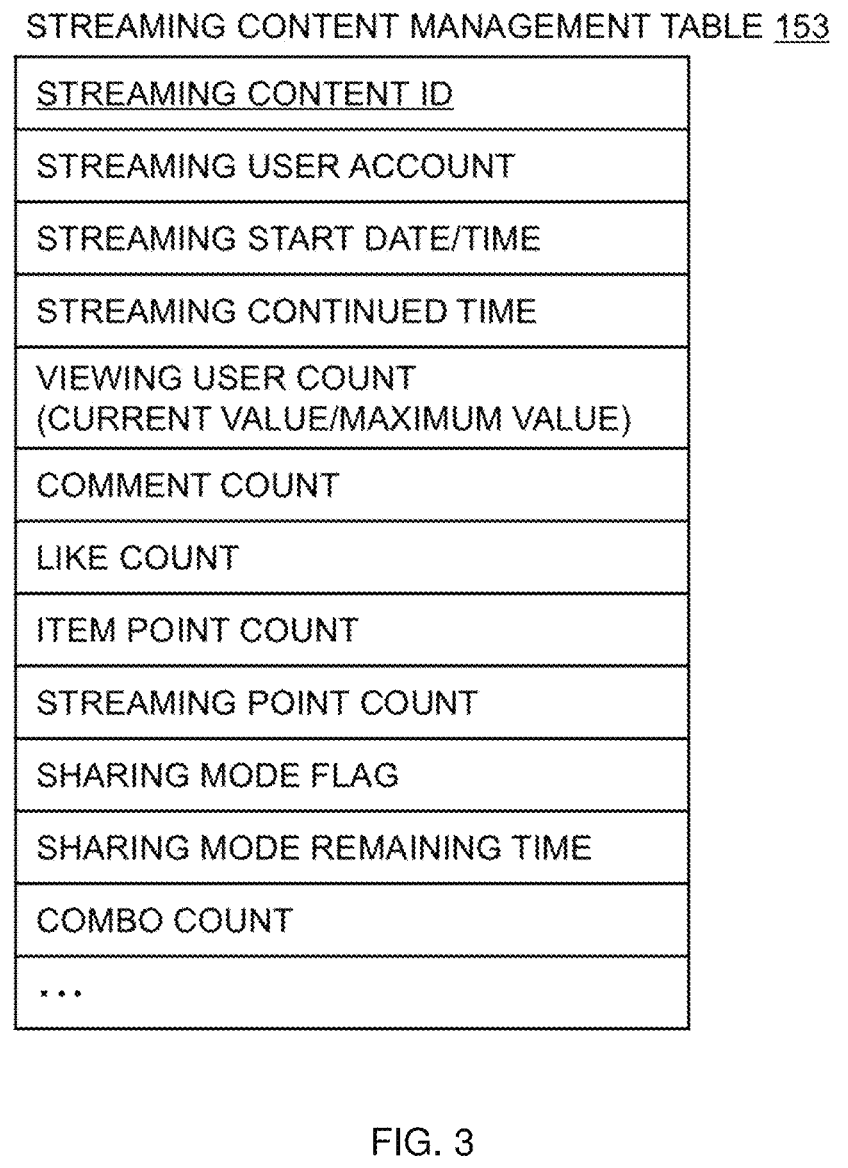

STREAMING CONTENT MANAGEMENT TABLE 153

| |
|---|
| STREAMING CONTENT ID |
| STREAMING USER ACCOUNT |
| STREAMING START DATE/TIME |
| STREAMING CONTINUED TIME |
| VIEWING USER COUNT<br>(CURRENT VALUE/MAXIMUM VALUE) |
| COMMENT COUNT |
| LIKE COUNT |
| ITEM POINT COUNT |
| STREAMING POINT COUNT |
| SHARING MODE FLAG |
| SHARING MODE REMAINING TIME |
| COMBO COUNT |
| ... |

FIG. 3

SYSTEM, METHOD, AND NON-TRANSITORY COMPUTER-READABLE STORAGE MEDIUM STORING PROGRAM FOR STREAMING CONTENT

CROSS-REFERENCE TO RELATED APPLICATIONS

The present application is a continuation of the international application No. PCT/JP2023/033833, filed on Sep. 19, 2023, the content of which is incorporated herein in its entirety by reference.

TECHNICAL FIELD

The present invention relates to a system, method, and non-transitory computer-readable storage medium storing program for streaming content.

BACKGROUND

Systems for streaming content consisting of images and/or audio, or the like have introduced various mechanisms for encouraging users viewing the content (hereafter may be referred to as the viewing users) to communicate with each other. For example, Japanese Unexamined Patent Application Publication No. 2019-71957 discloses that a content streaming system performs bonus control when a user viewing content transmits text or images and different viewing users continuously transmit text or images related to the transmitted text or the like in a chain.

See Japanese Unexamined Patent Application Publication No. 2019-71957.

SUMMARY

The above system offers a bonus in response to multiple viewing users transmitting text or images in a chain. However, transmitting text or the like while viewing content can be said to be monotonous experience for users. For this reason, for example, each viewing user has difficulty in obtaining a sufficient sense of unity with other viewing users.

An object of embodiments of the present invention is to allow each content viewing user to obtain an increased sense of unity with other viewing users. Other objects of the embodiments of the present invention are clarified by referring to the entire present specification.

A system according to one embodiment of the present invention is a system for streaming content. The system includes one or more computer processors. The one or more computer processors perform operations including presenting a viewing screen for viewing the content to multiple viewing users and starting a predetermined mode in which the viewing users are allowed to perform predetermined input, in response to one of the viewing users satisfying a predetermined condition. The viewing screen is configured to allow the viewing users to perform the predetermined input therethrough in accordance with start of the predetermined mode.

A method according to one embodiment of the present invention is a method for streaming content. The method is performed by one or more computers. The method includes presenting a viewing screen for viewing the content to multiple viewing users and starting a predetermined mode in which the viewing users are allowed to perform predetermined input, in response to one of the viewing users satisfying a predetermined condition. The viewing screen is configured to allow the viewing users to perform the predetermined input therethrough in accordance with start of the predetermined mode.

A non-transitory computer-readable storage medium storing a program according to one embodiment of the present invention is a non-transitory computer-readable storage medium storing a program for streaming content. The program causes one or more computers to perform operations including presenting a viewing screen for viewing the content to multiple viewing users and starting a predetermined mode in which the viewing users are allowed to perform predetermined input, in response to one of the viewing users satisfying a predetermined condition. The viewing screen is configured to allow the viewing users to perform the predetermined input therethrough in accordance with start of the predetermined mode.

The various embodiments of the present invention allow each user viewing content to obtain an increased sense of unity with other viewing users.

BRIEF DESCRIPTION OF DRAWINGS

FIG. 2 is a diagram illustrating information managed by a user information table 151.

FIG. 3 is a diagram illustrating information managed by a streaming content management table 153.

DETAILED DESCRIPTION

Figure 1:
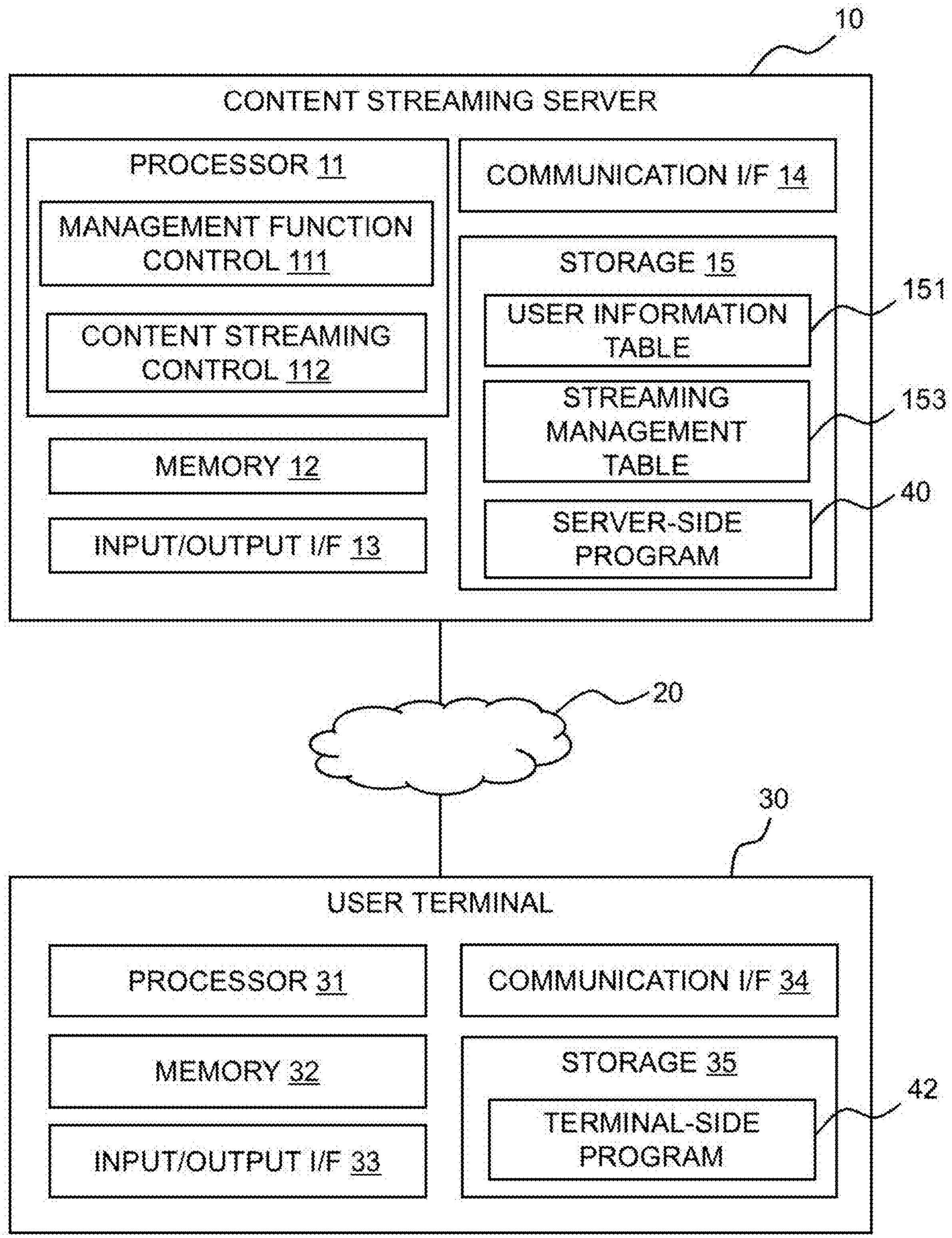
FIG. 1 is a configuration diagram schematically showing the configuration of a network including a content streaming server 10 according to one embodiment of the present invention.

Now, an embodiment of the present invention will be described with reference to the drawings. In the drawings, the same or similar components are given the same reference signs.

FIG. 1 is a configuration diagram schematically showing the configuration of a network including a content streaming server 10 according to one embodiment of the present invention. As shown, the server 10 is communicatively connected to a user terminal 30 through a communication network 20 such as the Internet. While FIG. 1 shows only one user terminal 30, the server 10 is communicatively connected to multiple user terminals 30. The server 10 provides a content streaming service to a user through the user terminal 30. The content streaming server 10 is an example of a device that implements all or part of a system of the present invention.

First, the hardware configuration of the content streaming server 10 will be described. The content streaming server 10 consists of a general computer. As shown in FIG. 1, it includes a computer processor 11, main memory 12, an input/output I/F 13, a communication I/F 14, and storage 15, and these components are electrically connected to each other through a bus (not shown).

The computer processor 11 consists of a CPU, GPU, or the like. It loads a program stored in the storage 15 or the like into the main memory 12 and executes various commands included in the program. The main memory 12 consists of, for example, DRAM or the like.

The input/output I/F 13 includes various input/output devices for exchanging information with an operator or the like. For example, the input/output I/F 13 includes an information input device such as a keyboard or a pointing device (e.g., a mouse, touchscreen, etc.), a sound input device such as a microphone, and an image input device such as a camera. The input/output I/F 13 also includes an image output device such as a display and a sound output device such as a speaker.

The communication I/F 14 is implemented as hardware such as a network adapter, any type of communication software, or a combination of these and is configured to perform wired or wireless communication through the communication network 20 or the like.

The storage 15 consists of, for example, a magnetic disk, flash memory, or the like. The storage 15 is storing various programs including an operating system, various types of data, and the like. For example, as shown in FIG. 1, the storage 15 is storing a user information table 151 for managing information on the users of content streaming services and a streaming content management table 153 for managing information on each streaming content. The storage 15 is also storing, for example, a server-side program 40 according to the one embodiment of the present invention. The program 40 is a program for causing the server 10 to function as all or part of the system for providing a content streaming service. The server-side program 40 may be configured such that at least part thereof is executed on the user terminal 30 through a terminal-side program 42 (to be discussed later).

In the present embodiment, the content streaming server 10 may consist of multiple computers each having the above hardware configuration. For example, the content streaming server 10 may consist of multiple server devices.

The content streaming server 10 thus configured can function as a web server and application server. In this case, it can perform various processes in response to a request from the terminal-side program 42 installed in the user terminal 30 and transmit screen data (e.g., HTML data), control data, and the like corresponding to the results of the processes to the user terminal 30. The user terminal 30 can output thereon web pages or other screens based on the received data.

Next, the hardware configuration of the user terminal 30 will be described. The user terminal 30 consists of a general computer. As shown in FIG. 1, the user terminal 30 includes a computer processor 31, main memory 32, an input/output I/F 33, a communication I/F 34, and storage 35, and these components are electrically connected to each other through a bus (not shown).

The computer processor 31 consists of a CPU, GPU, or the like. It loads any program stored in the storage 35 or the like into the main memory 32 and executes various commands included in the program. The main memory 32 consists of, for example, DRAM or the like.

The input/output I/F 33 includes various input/output devices for exchanging information with an operator or the like. For example, the input/output I/F 33 includes an information input device such as a keyboard or a pointing device (e.g., a mouse, touchscreen, etc.), a sound input device such as a microphone, and an image input device such as a camera. The input/output I/F 33 also includes an image output device such as a display and a sound output device such as a speaker.

The communication I/F 34 is implemented as hardware such as a network adapter, any type of communication software, or a combination of these and is configured to perform wired or wireless communication through the communication network 20 or the like.

The storage 35 consists of, for example, a magnetic disk, flash memory, or the like. The storage 35 is storing various programs including an operating system, various types of data, and the like. The programs stored in the storage 35 are, for example, those downloaded and installed from an application market or the like. The storage 35 is also storing the terminal-side program 42. The program 42 may consist of a web browser or any other application (for example, a terminal-side application for a content streaming service, etc.) and may be configured to execute at least part of the server-side program 40, as described above.

In the present embodiment, the user terminal 30 may consist of a smartphone, tablet terminal, personal computer, wearable device, or the like.

The user who operates the user terminal 30 thus configured is able to use a content streaming service provided by the content streaming server 10 by communicating with the server 10 through the terminal-side program 42 installed in the storage 35 or the like.

Next, the functions of the content streaming server 10 configured as described above will be described. As shown in FIG. 1, the computer processor 11 of the server 10 is configured to function as a management function control unit 111 and a content streaming control unit 112 by executing commands included in a program (for example, at least part of the server-side program 40) loaded into the main memory 12.

The management function control unit 111 is configured to perform various processes related to the control of content streaming service management functions. For example, the management function control unit 111 transmits screen data, control data, and the like of various screens related to the management functions to the user terminal 30, performs various processes in response to input performed by the user through the screens outputted on the user terminal 30, and transmits the screen data, control data, and the like corresponding to the results of the processes to the user terminal 30. The management functions controlled by the management function control unit 111 include, for example, login processing (user authentication), billing control, user account management, and the like.

The content streaming control unit 112 is configured to perform various processes related to the control of streaming of content. For example, the content streaming control unit 112 is configured to stream content to the user terminals 30 of multiple viewing users (hereafter may be referred to as the viewing terminals 30). For example, the content streaming control unit 112 presents a viewing screen for viewing the content to the viewing users, that is, transmits screen data, control data, and the like of the viewing screen to the viewing terminals 30.

In the present embodiment, the content streaming control unit 112 is configured to, in response to one of multiple users viewing specific content satisfying a predetermined condition, start a predetermined mode in which the viewing users are allowed to perform predetermined input with respect to the content. Examples of the predetermined input include input of an object such as an item, image, or text, input of an evaluation such as "like", and so on. Typically, when the predetermined input is performed, a corresponding display is made on the viewing screen of each viewing terminal 30.

In the present embodiment, the viewing screen presented to each viewing user is configured to allow the viewing user to perform the predetermined input therethrough in accordance with the start of the predetermined mode.

As described above, the content streaming server 10 according to the present embodiment starts the predetermined mode in response to one of users viewing specific content satisfying the predetermined condition and allows the other users viewing the same content to perform the predetermined input through the viewing screen presented to them, in accordance with the start of the predetermined mode. Thus, each viewing user is allowed to enjoy such a predetermined mode together with other users. That is, the server 10 allows each user viewing content to obtain an increased sense of unity with other viewing users. Examples of content streamed in the present embodiment include various types of digital content. For example, content consists of images (a video or still images) and audio, or consists of one of them. For example, content is streamed from the user terminal 30 of a user in real time (such user terminal 30 and user may be hereafter referred to as the streaming terminal 30 and streaming user, respectively) (live streaming), or is previously stored in a storage device such as the storage 15. The live streaming of content may accompany a certain delay (time lag) due to a setting made by the streaming user, the network situation, or the like. For example, the live streaming of content is performed using a streaming method that uses a protocol such as HTTP Live Streaming (HLS).

Content streamed from the streaming terminal 30 consists of, for example, a video and audio of the streaming user inputted through (captured by) the camera and microphone of the streaming terminal 30, or a video corresponding to a screen outputted from an application (for example, a game) being executed by the streaming terminal 30 and audio outputted from the application, and/or the audio of the streaming user inputted through the microphone of the streaming terminal 30.

A part of data constituting content streamed in the present embodiment may be streamed from the streaming terminal 30 in real time, and another part of the data may be previously stored in the server 10 or viewing terminals 30. For example, audio constituting a part of content may be streamed from the streaming terminal 30 in real time, and images constituting another part of the content may be previously stored in the server 10 or viewing terminals 30. The server 10 or viewing terminals 30 then may generate the content on the basis of these parts of data.

For example, in addition to audio constituting a part of content, motion data for moving an object such as a character may be streamed from the streaming terminal 30 in real time, and images constituting another part of the content may be previously stored in the server 10 or viewing terminals 30. The images include model data of the object. The motion data is generated on the basis of, for example, motions (including changes in the facial expression, or the like) of the streaming user recognized through the camera of the streaming terminal 30. The content generated by the server 10 or viewing terminals 30 includes the object that moves on the basis of the model data and motion data.

In the present embodiment, the viewing screen may be configured to allow each viewing user to perform the predetermined input therethrough in various ways. For example, the viewing screen may be configured to display an object for performing the predetermined input in accordance with the start of the predetermined mode and thus may receive the predetermined input in response to the viewing user selecting the object. The object may be formed as a transparent or semi-transparent object. Such a configuration allows each viewing user to perform the predetermined input through the object disposed on the viewing screen.

In the present embodiment, the predetermined input may be input of a predetermined item that cannot be inputted except during the predetermined mode. In this case, the viewing screen may be configured to allow each viewing user to select the predetermined item from multiple items in accordance with the start of the predetermined mode. Such a configuration allows each viewing user to input the predetermined item during the predetermined mode.

The viewing screen may be configured to allow each viewing user to perform the predetermined input after performing confirmation input. For example, the viewing screen may be configured to display an object for performing the confirmation input in accordance with the start of the predetermined mode and thus to allow each viewing user to perform the predetermined input therethrough after selecting this object. Such a configuration prevents each viewing user from unintentionally performing the predetermined input.

In the present embodiment, the predetermined condition for starting the predetermined mode can be various conditions. For example, the predetermined condition may be a condition that is satisfied in response to a parameter associated with a viewing user reaching a predetermined value. The predetermined condition may also be a condition that is satisfied in response to a viewing user inputting a predetermined item. The predetermined item may be a limited-time item that can be inputted when the current date and time are within a predetermined period. Such a configuration encourages each viewing user to input the predetermined item.

Moreover, in accordance with the start of the predetermined mode, information on a viewing user who has satisfied the predetermined condition (for example, the account name and/or profile image of the viewing user) may be displayed on the viewing screen. Such a configuration encourages each viewing user to satisfy the predetermined condition.

In the present embodiment, the predetermined mode may be ended in response to the time elapsed since the start of the predetermined mode reaching a predetermined value. In this case, the predetermined value may be increased as the predetermined input is performed more frequently (that is, the predetermined mode may be extended as the predetermined input is performed more frequently). Such a configuration encourages each viewing user to perform the predetermined input more frequently during the predetermined mode.

In the present embodiment, the viewing screen may display a representation on the basis of the predetermined input during the predetermined mode. For example, the representation is displayed on the basis of the value of a parameter that is increased in response to the predetermined input. Specifically, for example, a first representation is displayed in response to the value of the parameter reaching a first threshold, and a second representation different from the first representation is displayed in response to the value of the parameter reaching a second threshold. Examples of the parameter that is increased in response to predetermined input include the frequency of the predetermined input, the number of viewing users who have performed the predetermined input, the maximum combo count of the predetermined input (the combo count continues to increase, for example, as long as the predetermined input is continuously performed at intervals within a predetermined time), the number of values (for example, points, coins, etc.) that have been consumed associated with the predetermined input, and the like. Such a configuration encourages each viewing user to perform the predetermined input during the predetermined mode.

Next, a specific example as an aspect of the content streaming server 10 according to the present embodiment having the above functions will be described. A content streaming service in this example is a service that allows each streaming user to live stream content consisting of a video including a character provided by the streaming user and the audio of the streaming user and allows each viewing user to view the content. Model data of the character is previously uploaded to the server 10 (storage 15) by the streaming user and is downloaded by the viewing terminals 30 of the viewing users when the viewing users view the content of the streaming user, as will be detailed later. First, information managed by each table in this example will be described.

Figure 2:
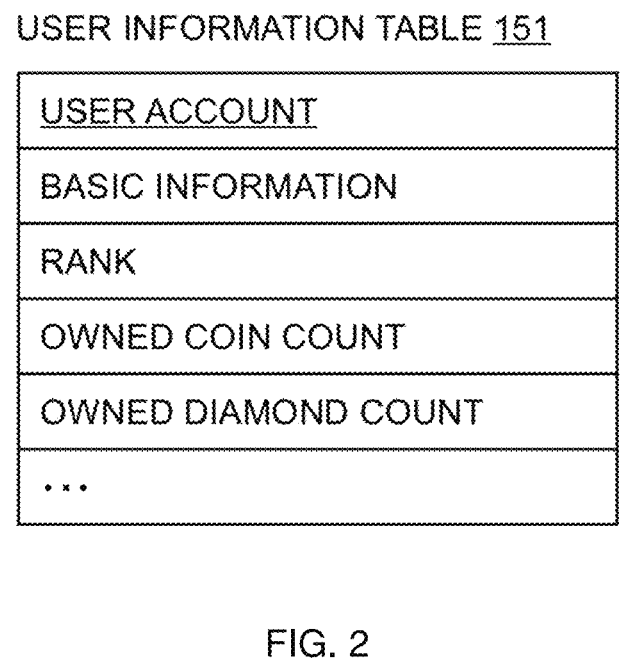

FIG. 2 illustrates information managed by the user information table 151 in this example. The user information table 151 manages information on the users who use a content streaming service. Specifically, as shown, it manages information such as "basic information" of each user, including the account name, birth date, and the like, "rank" indicating the rank of the user as a streaming user, "owned coin count" indicating the number of owned virtual coins available in a content streaming service, and "owned diamond count" indicating the number of owned virtual diamonds such that these pieces of information are associated with "user account" identifying the user.

In this example, coils are given to each user for free or for a fee in various opportunities. For example, each user can acquire coins as a reward such as a login bonus for free. For example, each user can purchase coins for a fee (with real currency).

In this example, diamonds are given to each streaming user as a reward. Specifically, the number of diamonds obtained by multiplying the content streaming time per predetermined period (for example, one day) by a reference number (the diamond count per hour) are given to each streaming user. The reference number is increased as the above rank is raised. The diamonds can be exchanged with coins or real currency.

FIG. 3 illustrates information managed by the streaming content management table 153 in this example. The streaming content management table 153 manages information on each streaming content. Specifically, as shown, it manages information such as "streaming user account" identifying a user who is streaming each streaming content, "streaming start date/time," which is the date and time of the start of the streaming of the content, "streaming continued time," which is the time over which the streaming of the content has been continued (the time elapsed since the start of the streaming of the content), "viewing user count (the current value and maximum value)," "comment count," which is the number of comments inputted by viewing users during the streaming of the content, "like count," which is the number of "like" inputted by viewing users during the streaming of the content, "item point count," which is the sum of item points given in response to input of an item by viewing users during the streaming of the content, "streaming point count," which is the sum of streaming points given to this streaming content, "sharing mode flag" indicating whether a sharing mode is being performed, "sharing mode remaining time," which is the remaining time of the sharing mode, and "combo count" indicating the combo count of input of a "sharing gift" during the sharing mode such that these pieces of information are associated with "streaming content ID" identifying the streaming content.

In this example, more streaming points are given as the streaming continued time, the viewing user count, the comment count, the like count, and/or the item point count are increased. The ranks of the above streaming users are determined and updated on the basis of the streaming point counts acquired by the streaming users in a predetermined period (for example, one day).

The foregoing is the description of the information managed by each table. Next, processes performed by the content streaming server 10, screens outputted on each user terminal 30, and the like in this example will be described.

Figure 4:
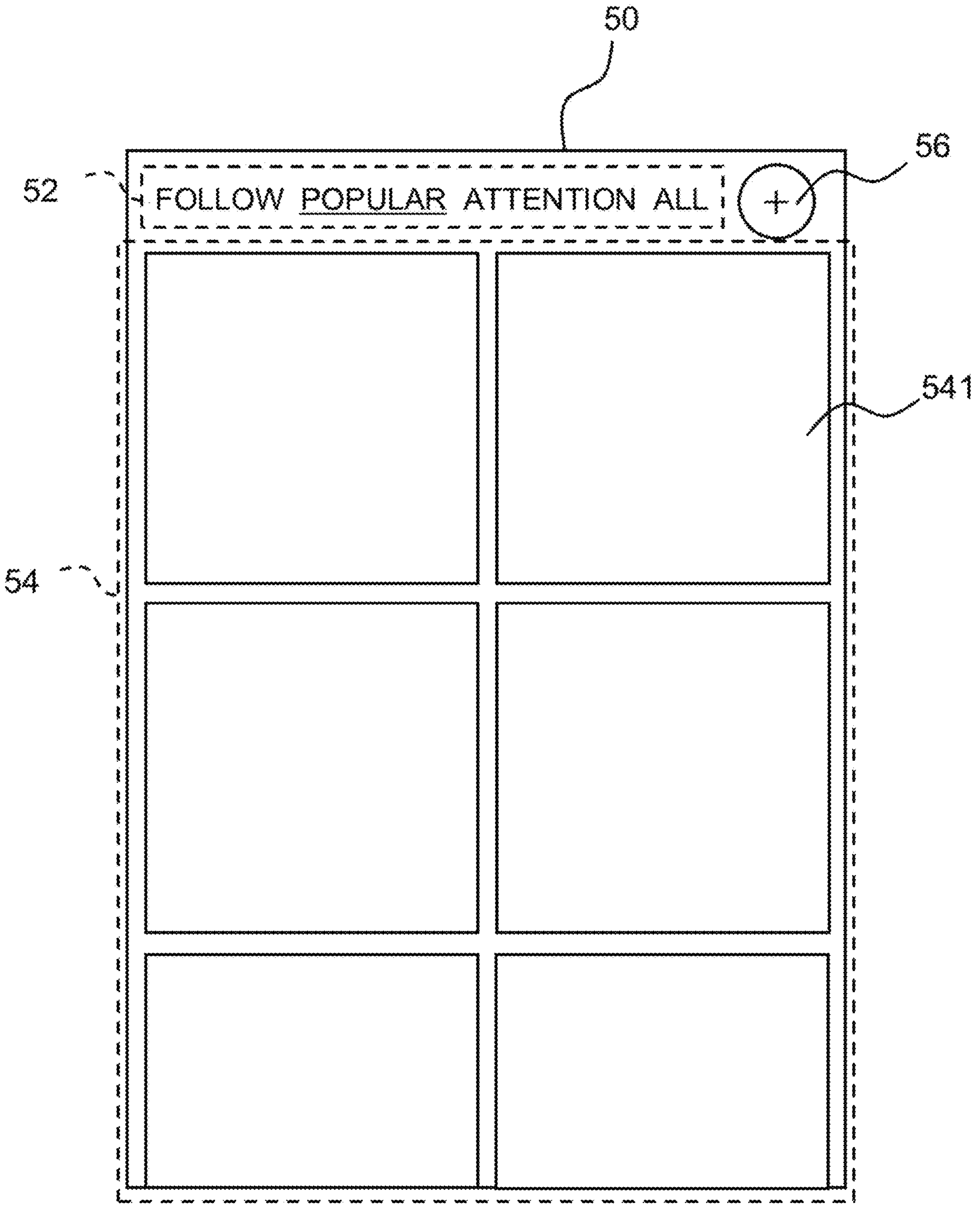
FIG. 4 is a diagram illustrating a top screen 50.

FIG. 4 illustrates a top screen 50 of a content streaming service outputted on each user terminal 30. The screen 50 serves as the start screen when using a content streaming service. Specifically, as shown, it includes a selection area 52 displaying text "follow", "popular", "attention" and "all", a listed display area 54 located below the area 52, and a circular streaming button 56 located at the upper-right corner of the screen.

The selection area 52 is an area for selecting content to be displayed in the listed display area 54. Specifically, when "follow" is selected in the selection area 52, pieces of content being streamed by other users followed by the user are listed in the listed display area 54. Similarly, when "popular" is selected in the selection area 52, pieces of streaming content being viewed by more viewers are listed in the listed display area 54. When "attention" is selected in the selection area 52, pieces of content attracting attention (for example, pieces of content having a larger comment count and/or like count, etc.) are listed in the listed display area 54. When "all" is selected in the selection area 52, all pieces of streaming content are listed in the listed display area 54.

As shown, multiple individual display areas 541 displaying information on individual pieces of streaming content are arranged in two columns in the up-down direction in the listed display area 54. Each individual display area 541 is configured to, in response to selection by the user, allow the user to start to view corresponding streaming content (to start to reproduce corresponding content). The listed display area 54 is configured such that the pieces of content displayed in the individual display areas 541 are changed by a flick operation, slide operation, or the like in the up-down direction. The individual display areas 541 display images previously set by streaming users, the account names of the streaming users, the viewer counts (the current values), and the like.

The streaming button 56 of the top screen 50 is an object used by the user to stream content as a streaming user. When the streaming button 56 is selected by the user, a streaming preparation screen (not shown) is outputted and the user is allowed to set the title or the like of the streaming content through this screen. The user then can issue an instruction to start the streaming of the content through the streaming preparation screen.

When an instruction to start the streaming of the content is issued, the streaming terminal 30 starts to transmit data indicating changes in the facial expression (specifically, motions of both eyes and mouth) of the streaming user captured by the camera of the streaming terminal 30 (hereafter referred to as the motion data) and audio data collected by the microphone of the streaming terminal 30 (speech data made by the streaming user) to the server 10. Also, in response to the start of the streaming of the content, a new record is inserted into the streaming content management table 153.

Figure 5:
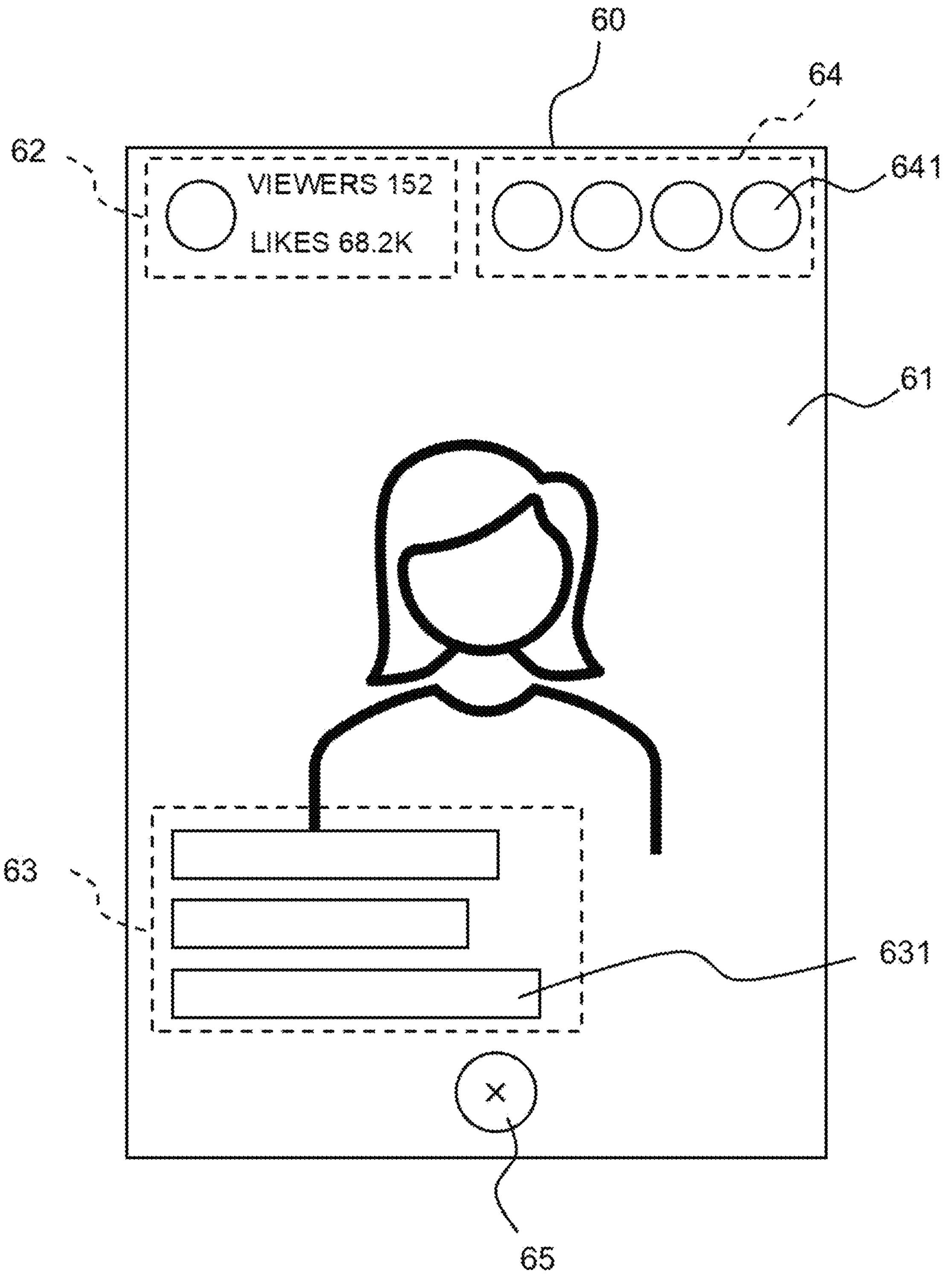
FIG. 5 is a diagram illustrating a streaming screen 60.

FIG. 5 illustrates a streaming screen 60 outputted on the streaming terminal 30 in response to the start of the streaming of the content. As shown, the screen 60 includes a video display area 61 corresponding to the entire screen, a basic information display area 62 located at the upper-left corner of the screen, a comment display area 63 located in a lower-left portion of the screen, a viewing user information display area 64 located at the upper-right corner of the screen, and a circular streaming stop button 65 located in the center of the lower end of the screen.

The video display area 61 is an area in which the content being streamed is displayed as a video. Specifically, a video including the above character whose both eyes and mouth move on the basis of the motion data based on the changes in the facial expression of the streaming user and the model data of the character is displayed in the video display area 61. The video is generated and outputted by the streaming terminal 30.

The basic information display area 62 is an area in which basic information of this streaming content is displayed. Specifically, streaming user information (a profile image, etc.), the viewing user count (the current value) of this streaming content, the number of "like" inputted by viewing users with respect to this streaming content, and the like are displayed in the basic information display area 62.

The comment display area 63 is an area for displaying user comments inputted by viewing users or system comments automatically inputted by the server 10. Specifically, multiple comment objects 631 corresponding to individual comments are arranged in the up-down direction in the area 63. The comment display area 63 is configured such that when a new comment is inputted, a corresponding comment object 631 is added to a lower portion thereof and the existing comment objects 631 are sequentially moved upward. In the comment display area 63, the displayed comment objects 631 are changed to different ones by a flick operation or slide operation in the up-down direction, or the like.

The viewing user information display area 64 is an area for displaying information on multiple viewing users who are viewing the content being streamed. Specifically, multiple icon objects 641 corresponding to the viewing users are arranged in the left-right direction in the area 64. Each object 641 has a circular shape and displays a profile image of a corresponding viewing user. The icon objects 641 are arranged in an order according to a predetermined rule.

The streaming stop button 65 is an object used by the streaming user to stop the streaming of the content. When the streaming stop button 65 is selected by the streaming user, the streaming of the content (the transmission of the motion data and audio data from the streaming terminal 30 to the server 10) is stopped.

Figure 6:
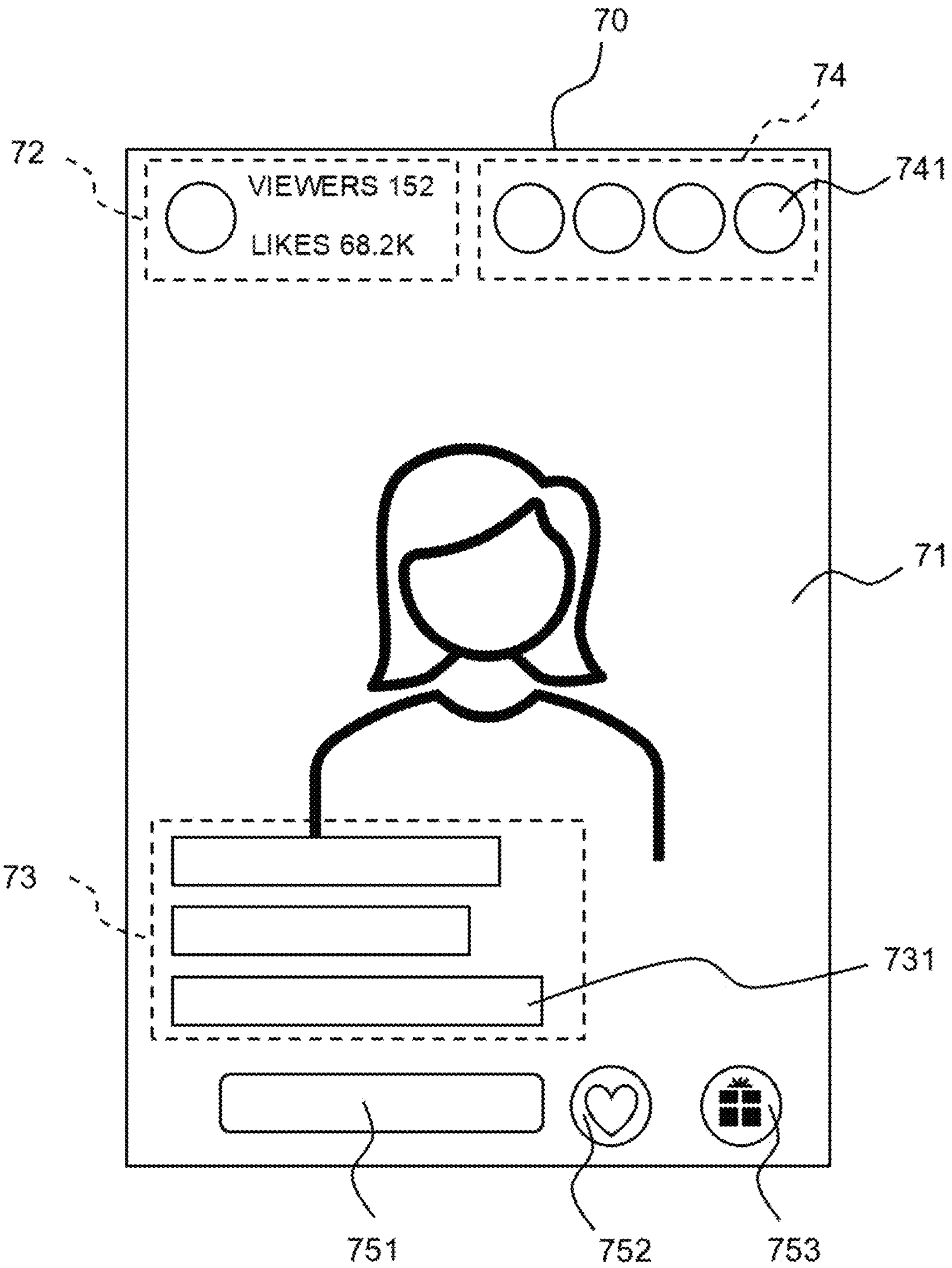
FIG. 6 is a diagram illustrating a viewing screen 70.

FIG. 6 illustrates a viewing screen 70 outputted on each viewing terminal 30. For example, when any content is selected by the viewing user through the listed display area 54 or the like of the top screen 50, a viewing screen 70 for viewing the selected content is outputted on the viewing terminal 30. As shown, as with the above streaming screen 60, the screen 70 includes a video display area 71, a basic information display area 72, a comment display area 73, and a viewing user information display area 74. The viewing screen 70 also has, at the lower end thereof, a comment input area 751, a "like" button 752 on which a heart mark is displayed, and an item input button 753 on which the design of a present is displayed.

As with the video display area 61 of the streaming screen 60, the video display area 71 is an area for displaying a video including the character of the streaming user. This video is a video generated and outputted by the viewing terminal 30 on the basis of the motion data transmitted from the streaming terminal 30 through the server 10, the model data of the character downloaded from the server 10, and the like.

The comment input area 751 is an area used by the viewing user to input a comment. When a character string is inputted into the area 751 and a confirmation operation is performed, the character string is transmitted as a user comment. Comment objects 631 and 731 corresponding to the user comment are added to the comment display areas 63 and 73 of the streaming screen 60 and viewing screens 70 of the corresponding streaming terminal 30 (the user terminal 30 of the user who is streaming the content being viewed) and the viewing terminals 30 (the user terminals 30 of multiple users who are viewing the content). The description (character string) of the user comment is displayed along with the account name of the viewing user who has inputted the user comment, on the comment objects 631 and 731 corresponding to the user comment. Moreover, when the user comment is inputted, the server 10 updates (increments by 1) the number of comments on the corresponding streaming content in the streaming content management table 153.

The "like" button 752 is an object used by the viewing user to input "like" with respect to the streaming user (the content). When the viewing user inputs "like" by selecting the button 752, comment objects 631 and 731 corresponding to a system comment notifying of the input of "like" are added to the comment display areas 63 and 73 of the corresponding streaming screen 60 and the viewing screens 70. Text indicating the input of "like" is displayed along with the account name of the viewing user who has inputted "like", on the comment objects 631 and 731 corresponding to the system comment. Moreover, corresponding visual effects (for example, animation effects in which a heart-shaped object is displayed to flow from the lower side to the upper side of the screen, etc.) are added to the video display areas 61 and 71 of the streaming screen 60 and the viewing screens 70. Furthermore, the server 10 updates (increments by 1) the "like count" of the corresponding streaming content in the streaming content management table 153.

Figure 7:
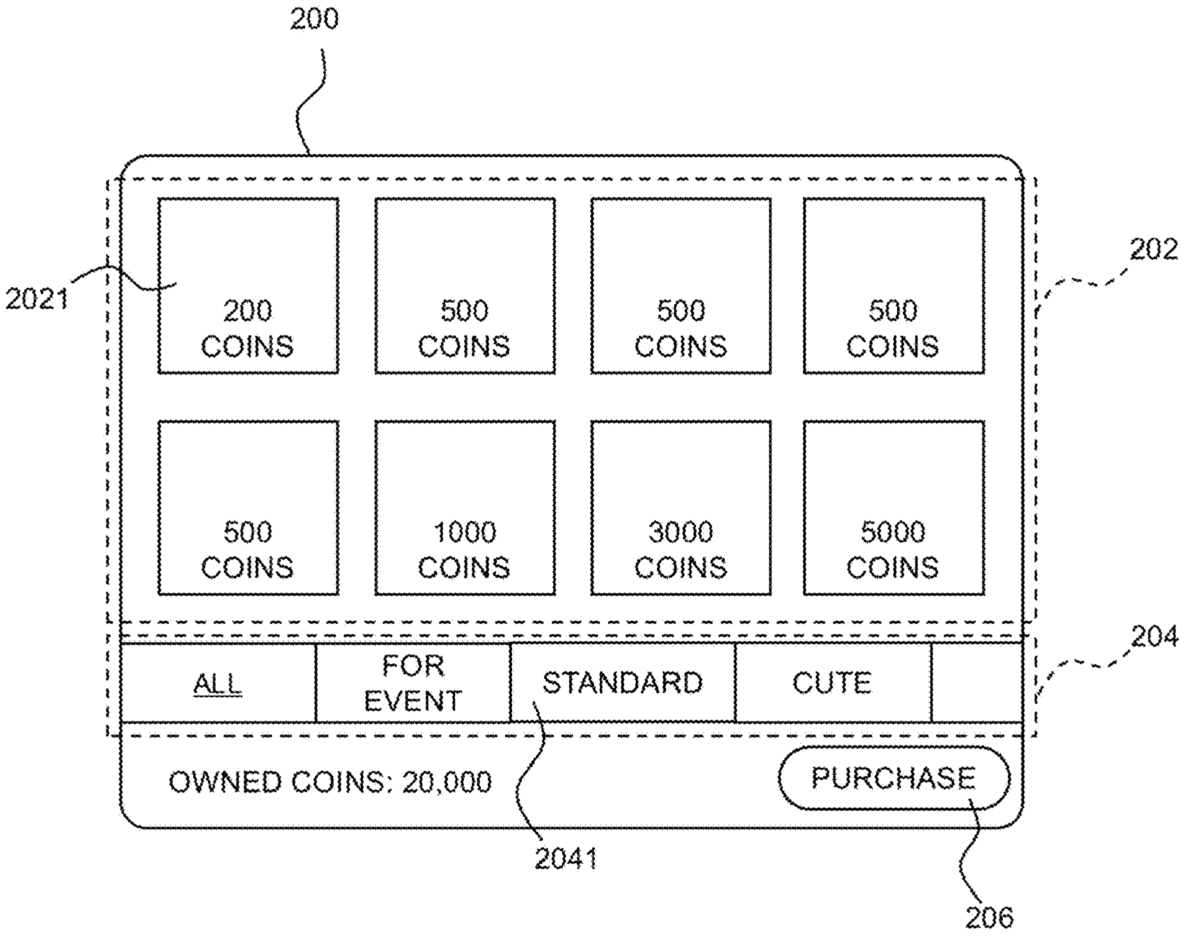
FIG. 7 is a diagram illustrating an item selection screen 200.

The item input button 753 is an object used by the viewing user to input an item. When the button 753 is selected by the viewing user, an item selection screen 200 for selecting an item to be inputted illustrated in FIG. 7 is superimposed on a lower area of the viewing screen 70. As shown, the screen 200 includes a listed display area 202 for listing items, a category selection area 204 disposed on the lower side of the area 202 and used to select the category of items to be displayed, and a purchase button 206 that is an object disposed at the lower-right corner of the screen and used to purchase coins. The number of coins owned by the corresponding user is displayed at the lower-left corner of the item selection screen 200.

As shown, the category selection area 204 is an area in which multiple category objects 2041 corresponding to individual categories are arranged in the left-right direction. The area 204 is configured such that the displayed category objects 2041 are changed to different ones by a flick operation or slide operation in the left-right direction, or the like. The category selection area 204 is also configured to allow the viewing user to select one of the category objects 2041. When any object 2041 is selected, the items listed in the listed display area 202 are narrowed down to items to which the corresponding category is added.

In this example, the multiple categories include a category “for event”. Also, in this example, an event in which the “sharing mode” can be enabled is held as a limited-time event. While such an event is held, the viewing user is allowed to start the sharing mode by selecting (that is, inputting) a dedicated item through the item selection screen 200. Details will be described latter. The dedicated item falls within the category “for event”.

As shown, in the listed display area 202, multiple individual display areas 2021 displaying information on individual items are arranged in four columns in the up-down direction. Each individual display area 2021 is an area in which an image corresponding to an item and the number of coins (price) required to input the item are displayed. The listed display area 202 is configured such that the displayed individual display areas 2021 are changed to different ones by a flick operation or slide operation in the up-down direction, or the like. When any individual display area 2021 is selected by the viewing user, a corresponding item is inputted.

When the item is inputted, comment objects 631 and 731 corresponding to a system comment notifying of the input of the item are added to the comment display areas 63 and 73 of the corresponding streaming screen 60 and the viewing screens 70. The name of the inputted item is displayed along with the account name of the viewing user who has inputted the item on the comment objects 631 and 731 corresponding to the system comment. Moreover, visual effects (video effects) corresponding to the inputted item are added to the video display areas 61 and 71 of the corresponding streaming screen 60 and the viewing screens 70. Furthermore, the server 10 gives, to this streaming content, the number of item points corresponding to the coin count (price) of the inputted item (for example, the point count is increased as the coin count is increased). Specifically, the server 10 adds the point count corresponding to the coin count to the item point count of the corresponding streaming content in the streaming content management table 153. The server 10 also subtracts the coin count of the inputted item from the number of coins owned by the corresponding user (the viewing user that has inputted the item) in the user information table 151.

The above “sharing mode”, which can be enabled while the limited-time event is held, will be described below. The sharing mode is a mode in which each viewing user is allowed to input a “sharing gift”. The sharing mode is started in response to any viewing user inputting the above dedicated item for starting the mode. Note that the sharing mode may be started after the streaming user performs a confirmation (approval) operation following the input of the dedicated item by the viewing user.

Figure 8:
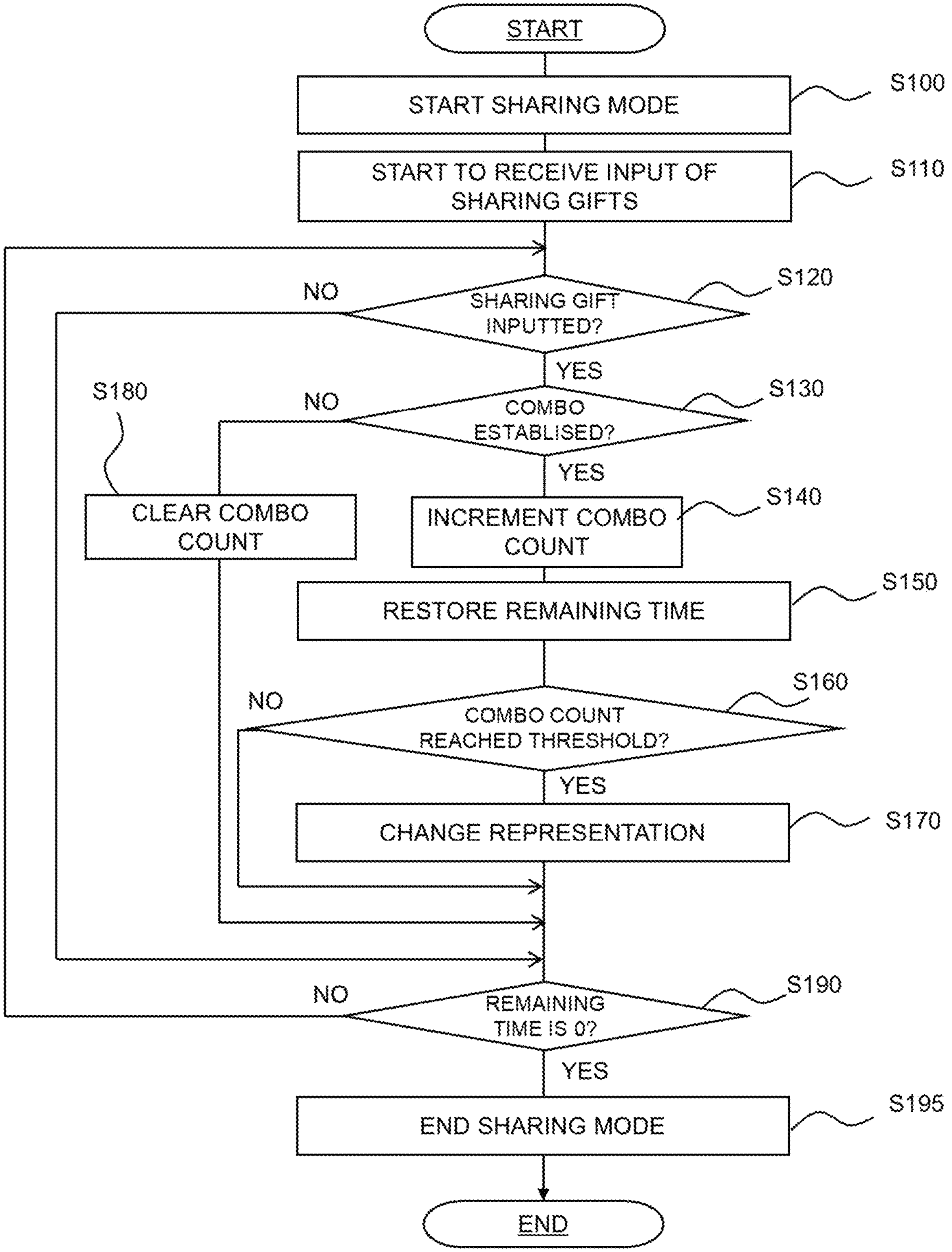
FIG. 8 is a flowchart illustrating a process that the server 10 performs in response to input of a dedicated item for starting a sharing mode.

FIG. 8 is a flowchart illustrating a process that the server 10 performs in response to the input of the dedicated item for starting the sharing mode. As shown, the server 10 first starts the sharing mode (step S100). Specifically, the server 10 updates the “sharing mode flag” of the corresponding streaming content in the streaming content management table 153 and starts to update (count down) the “sharing mode remaining time” of the corresponding streaming content. In this example, the initial value of the sharing mode continued time is 3 minutes, and the countdown of the remaining time is started from 3 minutes. The server 10 also starts to display a representation for the sharing mode on the content being streamed. For example, the server 10 changes the background image of the character included in the video to an image for the sharing mode.

Figure 9:
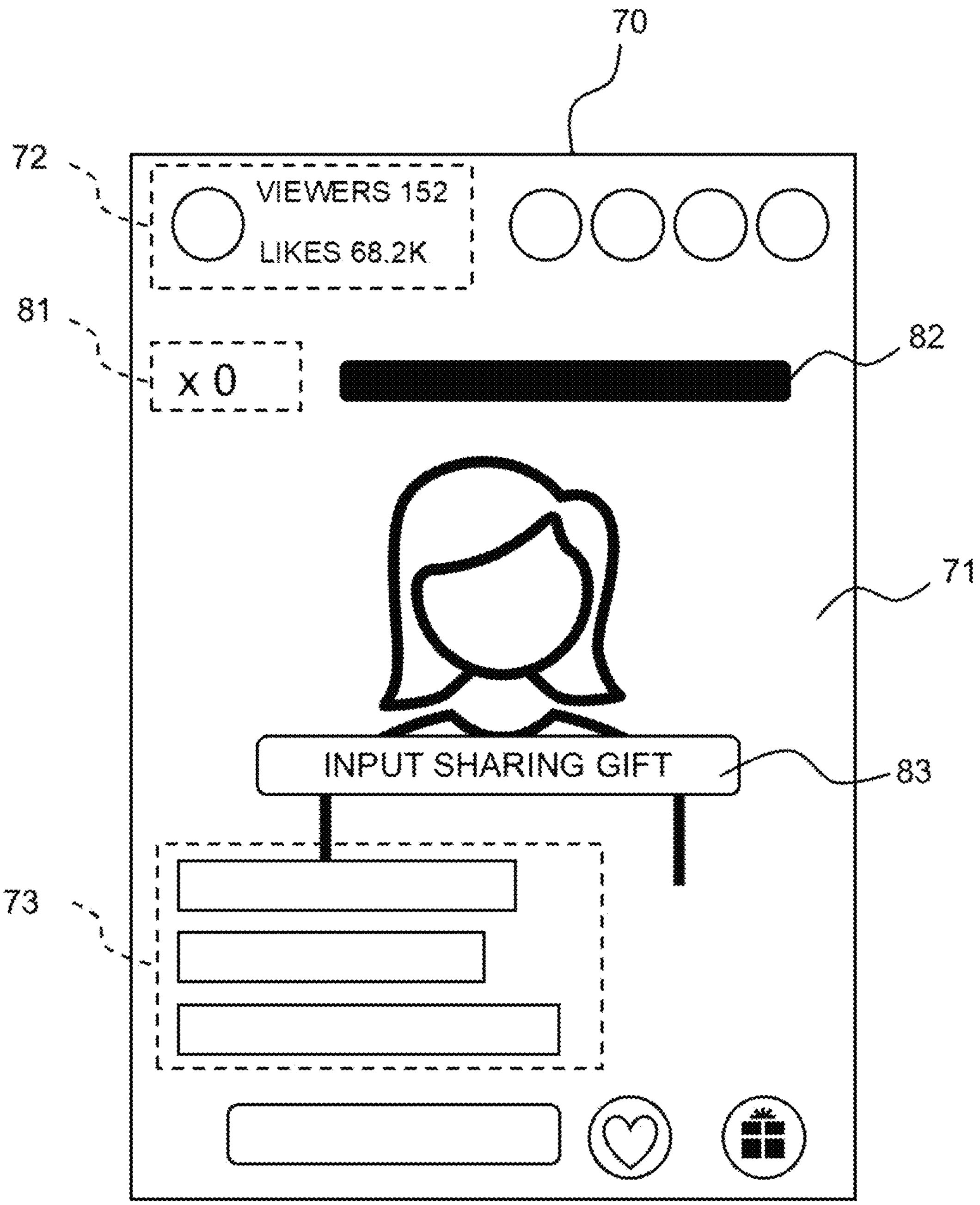
FIG. 9 is a diagram illustrating the viewing screen 70 after the sharing mode is started.

The server 10 then starts to receive input of sharing gifts (step S110). FIG. 9 illustrates the viewing screen 70 of each viewing user after the sharing mode is started. As shown, the viewing screen 70 in this state includes a combo count display area 81 located on the lower side of the basic information display area 72 and used to display the combo count of input of sharing gifts, a remaining time indicator 82 located on the right side of the area 81 and indicating the remaining time of the sharing mode, and a sharing gift input start button 83 located on the upper side of the comment display area 73 and having text “input sharing gift” displayed thereon. Note that the viewing screen 70 in this state may display information (for example, a profile image, etc.) on the viewing user who has inputted the dedicated item (that is, the viewing user who has started the sharing mode) in a predetermined position. When the viewing user selects the sharing gift input start button 83, this viewing user is allowed to input a sharing gift. Note that the viewing user may be allowed to input a sharing gift without having to select the sharing gift input start button 83 (that is, without having to perform confirmation input).

Figure 10:
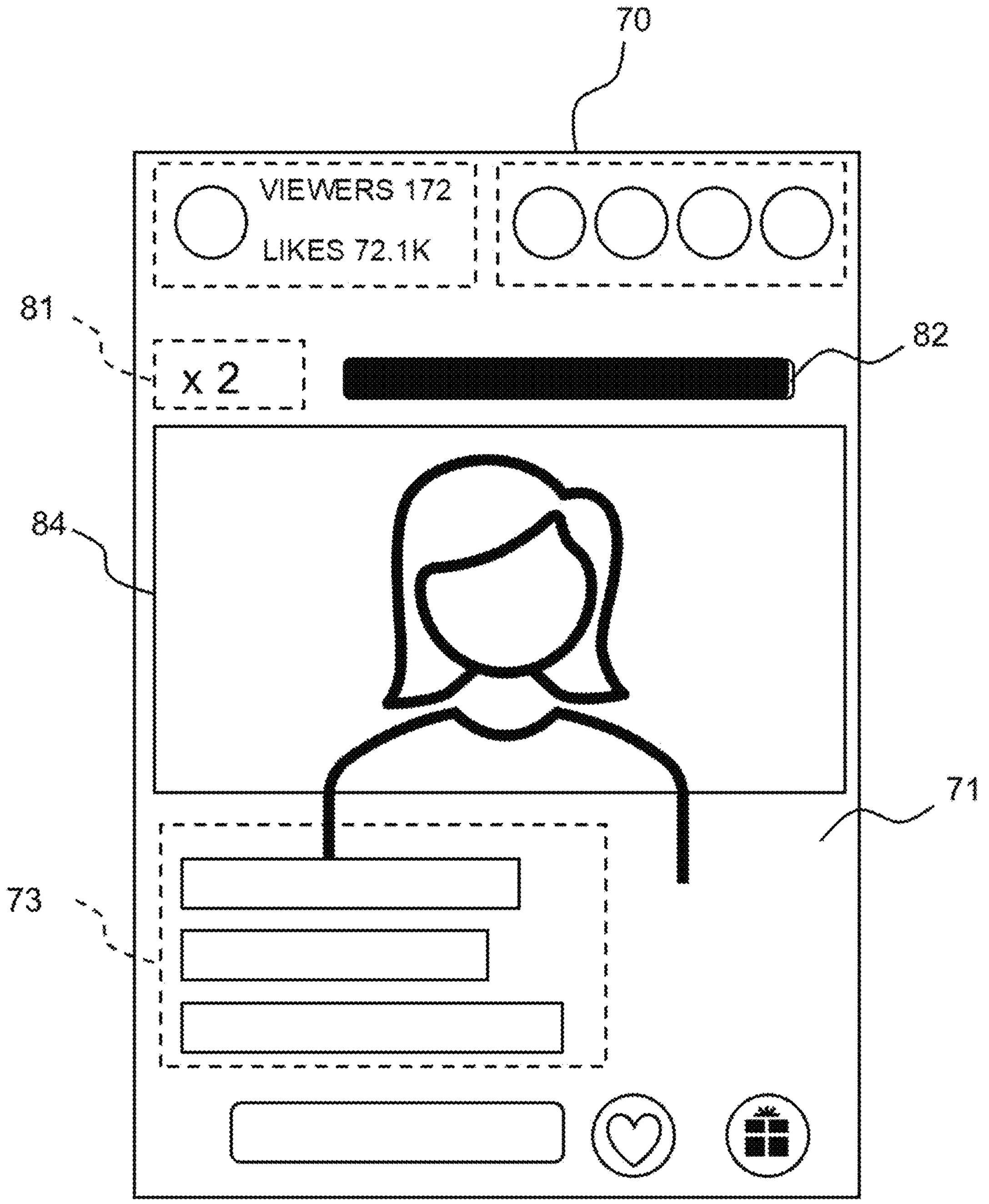
FIG. 10 illustrates the viewing screen 70 after a sharing gift input start button 83 is selected.

FIG. 10 illustrates the viewing screen 70 after the sharing gift input start button 83 is selected. As shown, in the viewing screen 70 in this state, a sharing gift input object 84 is disposed in place of the sharing gift input start button 83. The object 84 consists of a semi-transparent object and covers the belt area between the combo count display area 81 and the remaining time indicator 82, and the comment display area 73. The viewing user can input a sharing gift by selecting (for example, tapping) any position of the object 84.

Figure 11:
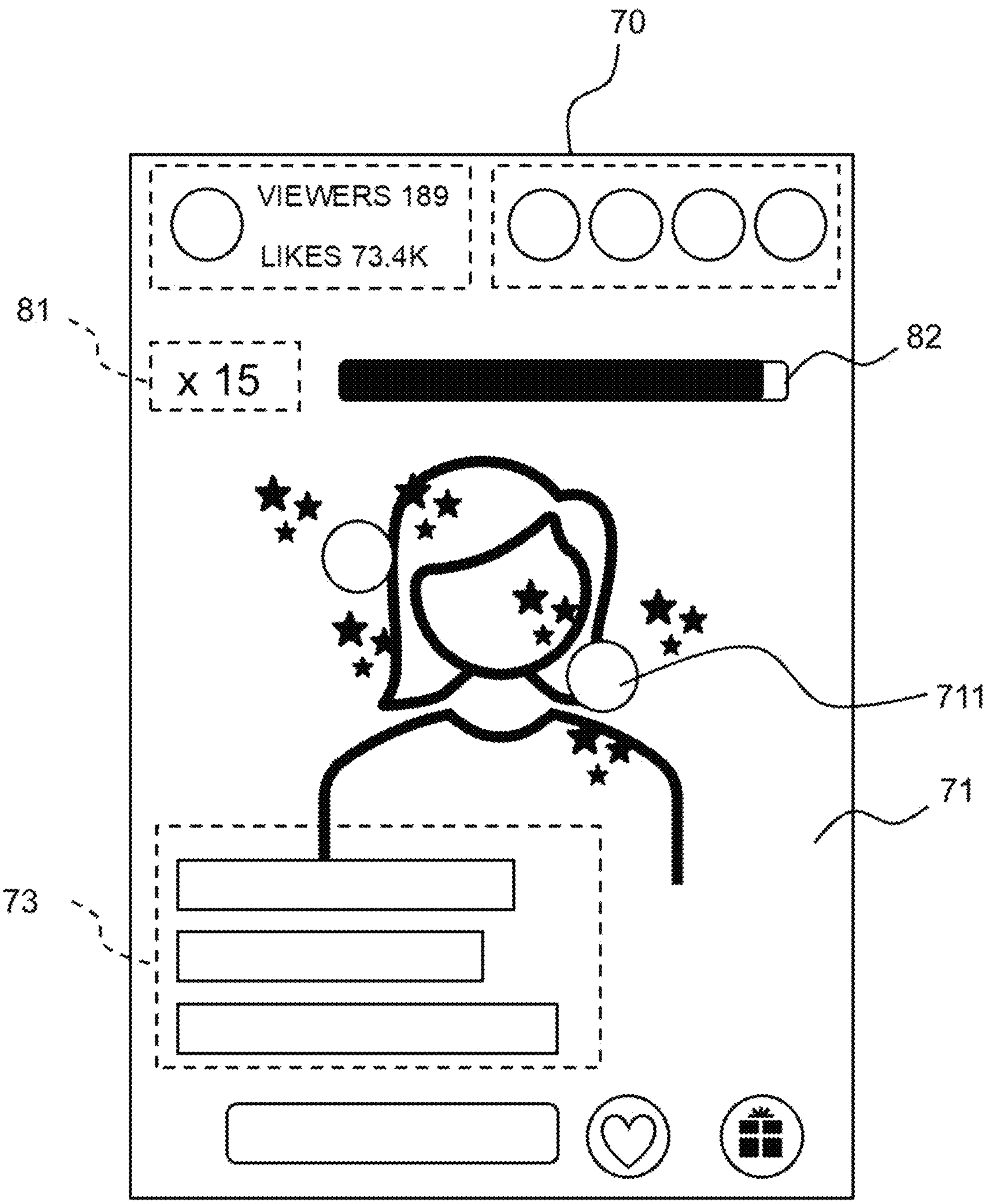
FIG. 11 illustrates the viewing screen 70 to which visual effects have been added in response to input of a sharing gift.

When a sharing gift is inputted, corresponding visual effects (video effects) are added to the video display areas 61 and 71 of the corresponding streaming screen 60 and the viewing screens 70. FIG. 11 illustrates the viewing screen 70 to which visual effects have been added in response to input of the sharing gift. As shown, in the viewing screen 70 in this state, an icon object 711 corresponding to the viewing user who has inputted the sharing gift is disposed in the video display area 71. The object 711 has a circular shape and has the profile image of the corresponding viewing user displayed thereon. The icon object 711 is disposed with predetermined visual effects in response to the viewing user inputting the sharing gift and disappears with the lapse of a predetermined time. The position in which the object 711 is disposed corresponds to a position on the sharing gift input object 84 selected by the viewing user when inputting the sharing gift.

Moreover, when the sharing gift is inputted, the server 10 gives, to this streaming content, the number of item points corresponding to the coin count (price) of the sharing gift. Specifically, the server 10 adds the point count corresponding to the coin count to the item point count of the corresponding streaming content in the streaming content management table 153. The server 10 also subtracts the coin count of the sharing gift from the number of coins owned by the corresponding user (the viewing user that has inputted the sharing gift) in the user information table 151.

Referring back to the flowchart of FIG. 8, the server 10 then waits for input of sharing gifts until the remaining time of the sharing mode expires (NO in step S120 and NO in step S190). When a sharing gift is inputted (YES in step S120), the server 10 determines whether a combo has been established (step S130). In this example, if the time elapsed from the preceding (the most recent) input of a sharing gift (this input may be input by the same viewing user as the viewing user who has inputted the sharing gift this time or by a different viewing user) falls within a threshold (for example, within 5 seconds), the server 10 determines that a combo has been established. In contrast, if the elapsed time exceeds the threshold, it determines that no combo has been established.

If the server 10 determines that a combo has been established (YES in step S130), it increments the combo count (step S140). Specifically, the server 10 increments the combo count of the corresponding streaming content by 1 in the streaming content management table 153. The display of the above combo count display area 81 is updated in accordance with the increment of the combo count.

The server 10 then restores the remaining time (step S150). Specifically, the server 10 adds a predetermined value (for example, 5 seconds) to the sharing mode remaining time of the corresponding streaming content in the streaming content management table 153. Note that the amount of restoration of the remaining time may be changed in accordance with the combo count or the like (for example, the amount of restoration may be increased or reduced as the combo count is increased).

When the combo count reaches a threshold (YES in step S160), the server 10 changes the representation (step S170). In this example, each time the combo count reaches any of multiple thresholds set stepwise, the representation is changed to a representation corresponding to the reached threshold. Multiple representations corresponding to the multiple thresholds differ from each other in, for example, at least one of the background image, visual effects, and BGM. Each viewing user can enjoy stepwise changes in the representation by continuously inputting sharing gifts to increase the combo count.

In contrast, if the server 10 determines in step S130 that no combo has been established (NO in step S130), it clears the combo count (step S180). Specifically, the server 10 sets 0 as the combo count of the corresponding streaming content in the streaming content management table 153. The display of the above combo count display area 81 is updated in accordance with the clearing of the combo count.

As seen above, a representation is displayed in response to each viewing user inputting a sharing gift during the sharing mode. When the remaining time of the sharing mode becomes 0 (YES in step S190), the server 10 ends the sharing mode (step S195).

While, in the above example, the sharing mode is started in response to input of the dedicated item, the condition for starting the sharing mode is not limited to input of the dedicated item. In another example of the present embodiment, the sharing mode may be started in response to any viewing user satisfying a predetermined condition related to an action such as input of a comment, like, or item.

While, in the above example, each viewing user is allowed to input a "sharing gift" during the sharing mode, each viewing user may be allowed to input an item other than such an item, an object, an evaluation, or the like. For example, each viewing user may be allowed to input an evaluation different from "like".

While, in the above example, each viewing user is allowed to input a sharing gift through the sharing gift input object 84 disposed on the viewing screen 70, the method for allowing each viewing user to input a sharing gift is not limited to the disposition of such an object. For example, each viewing user may be allowed to input a sharing gift through the item selection screen 200. In this case, each viewing user may be allowed to select a sharing gift through the screen 200 in accordance with the start of the sharing mode.

In the above example, different representations are displayed on the basis of the combo count of input of a sharing gift during the sharing mode. However, the combo count is an example of a parameter that is increased in accordance with input of a sharing gift. In another example of the present embodiment, a representation may be displayed on the basis of a parameter other than the combo count (for example, the number of inputs of a sharing gift, the number of viewing users who have inputted a sharing gift, the number of coins consumed by input of a sharing gift, etc.).

In the above example, a content streaming service is a service that allows each streaming user to live stream content consisting of a video including the character of the streaming user and the audio of the streaming user and allows each viewing user to view the content. However, in another example of the present embodiment, other various types of content may be streamed. For example, content may consist of a video and audio transmitted from a streaming terminal 30, may consist of audio transmitted from a streaming terminal 30 and a predetermined image. Content previously stored in the server 10 (storage 15) may be simultaneously viewed by multiple viewing users.

As described above, the content streaming server 10 according to the present embodiment starts the predetermined mode (for example, the sharing mode) in response to one of users viewing specific content satisfying the predetermined condition (for example, inputting the dedicated item) and allows the other users viewing the same content to perform the predetermined input through the viewing screen presented to them, in accordance with the start of the predetermined mode (for example, disposes the sharing gift input object 84 in response to any viewing user selecting the sharing gift input start button 83). This allows each viewing user to enjoy such a predetermined mode together with the other users. That is, the server 10 allows each user viewing the content to obtain an increased sense of unity with the other viewing users.

In another embodiment of the present invention, some or all of the functions of the content streaming server 10 according to the above embodiment may be performed by collaboration of the server 10 and each user terminal 30, or may be performed by each user terminal 30.

The processes and procedures described in the present specification may be performed by software, hardware, or any combination thereof other than those described explicitly. For example, the processes and procedures described in the present specification may be performed by implementing logic corresponding to the processes and procedures in a medium such as an integrated circuit, volatile memory, non-volatile memory, or magnetic disk. The processes and procedures described in the present specification may also be implemented as a computer program corresponding to those and performed by various types of computers.

Even when it is stated that the processes and procedures described in the present specification are performed by a single device, software, component, or module, those processes or procedures may be performed by multiple devices, multiple types of software, multiple components, and/or multiple modules. The software and hardware components described in the present specification may be implemented by integrating them into less components or by decomposing them into more components.

When the components of the invention are each described in a singular or plural form in the present specification or even when each component is described without specifying a singular form or plural form, the number of the component may be singular or plural unless the number should be interpreted otherwise in the context.

What is claimed is:

1. A system for streaming content, the system comprising one or more computer processors, wherein the one or more computer processors perform operations comprising:

presenting a viewing screen for viewing the content to a plurality of viewing users; and starting a predetermined mode in which the viewing users are allowed to perform predetermined input, in response to one of the viewing users satisfying a predetermined condition, wherein the viewing screen is configured to display an object only at or after a start of the predetermined mode, the object being configured to allow the viewing users to perform the predetermined input, wherein the operations further comprise receiving input of an item selected from a plurality of items through the viewing screen, wherein the predetermined condition is satisfied in accordance with an input of a first item included in the items, and wherein the operations further comprise ending the predetermined mode in response to a time elapsed since the start of the predetermined mode reaching a predetermined value.

2. The system of claim 1, wherein the predetermined input is input of a second item that cannot be inputted except during the predetermined mode, and wherein the viewing screen is configured to allow the viewing users to select the second item from the items therethrough in accordance with the start of the predetermined mode.

3. The system of claim 1, wherein the viewing screen is configured to allow the viewing users to perform the predetermined input after performing confirmation input.

4. The system of claim 1, wherein the first item is an item that can be inputted when a current date and time are within a predetermined period.

5. The system of claim 1, wherein the viewing screen is configured to display information on the one viewing user in accordance with the start of the predetermined mode.

6. The system of claim 1, wherein the predetermined value is increased in accordance with the predetermined input.

7. The system of claim 1, wherein the viewing screen is configured to display a representation based on the predetermined input in the predetermined mode.

8. The system of claim 7, wherein the viewing screen is configured to display the representation based on a value of a parameter that is increased in accordance with the predetermined input.

9. The system of claim 8, wherein the viewing screen displays a first representation in response to the value of the parameter reaching a first threshold and displays a second representation different from the first representation in response to the value of the parameter reaching a second threshold.

10. A method for streaming content, the method being performed by one or more computers, the method comprising:

presenting a viewing screen for viewing the content to a plurality of viewing users; and starting a predetermined mode in which the viewing users are allowed to perform predetermined input, in response to one of the viewing users satisfying a predetermined condition, wherein the viewing screen is configured to display an object only at or after a start of the predetermined mode, the object being configured to allow the viewing users to perform the predetermined input, wherein the method further comprises receiving input of an item selected from a plurality of items through the viewing screen, wherein the predetermined condition is satisfied in accordance with an input of a first item included in the items, and wherein the method further comprises ending the predetermined mode in response to a time elapsed since the start of the predetermined mode reaching a predetermined value.

11. A non-transitory computer-readable storage medium storing a program for streaming content, the program causing one or more computers to perform operations comprising:

presenting a viewing screen for viewing the content to a plurality of viewing users; and starting a predetermined mode in which the viewing users are allowed to perform predetermined input, in response to one of the viewing users satisfying a predetermined condition, wherein the viewing screen is configured to display an object only at or after a start of the predetermined mode, the object being configured to allow the viewing users to perform the predetermined input, wherein the operations further comprise receiving input of an item selected from a plurality of items through the viewing screen, wherein the predetermined condition is satisfied in accordance with an input of a first item included in the items, and wherein the operations further comprise ending the predetermined mode in response to a time elapsed since the start of the predetermined mode reaching a predetermined value.

* * * * *